United States Patent
Taylert et al.

(10) Patent No.: US 11,960,514 B1
(45) Date of Patent: Apr. 16, 2024

(54) INTERACTIVE CONVERSATION ASSISTANCE USING SEMANTIC SEARCH AND GENERATIVE AI

(71) Applicant: Drift.com, Inc., Boston, MA (US)

(72) Inventors: Matt Taylert, Richmond, VA (US); Bernard Ngombi Kiyanda, Mansfield, MA (US); Maria C. Moya, Everett, MA (US); Joseph S. Demple, Boston, MA (US); Matthew Pierce, Somerville, MA (US)

(73) Assignee: Drift.com, Inc., Boston, MA (US)

( * ) Notice: Subject to any disclaimer, the term of this patent is extended or adjusted under 35 U.S.C. 154(b) by 0 days.

(21) Appl. No.: 18/141,884

(22) Filed: May 1, 2023

(51) Int. Cl.
*G06F 40/40* (2020.01)
*G06F 16/332* (2019.01)
*G06F 40/30* (2020.01)

(52) U.S. Cl.
CPC ......... *G06F 16/3329* (2019.01); *G06F 40/30* (2020.01); *G06F 40/40* (2020.01)

(58) Field of Classification Search
USPC .............................................. 704/7–10, 257
See application file for complete search history.

(56) References Cited

U.S. PATENT DOCUMENTS

| | | | |
|---|---|---|---|
| 11,263,277 B1 * | 3/2022 | Podgorny | G06F 16/3329 |
| 2012/0016678 A1 * | 1/2012 | Gruber | H04M 1/7243 |
| | | | 704/E21.001 |
| 2013/0275164 A1 * | 10/2013 | Gruber | G10L 17/22 |
| | | | 705/5 |
| 2014/0059078 A1 * | 2/2014 | Gulwani | G06F 16/3331 |
| | | | 707/E17.014 |
| 2020/0334307 A1 * | 10/2020 | Prasad | G06F 16/9535 |
| 2021/0406260 A1 * | 12/2021 | Sharifi | G06F 16/23 |
| 2023/0061906 A1 * | 3/2023 | Gaur | G06F 16/243 |
| 2023/0095180 A1 * | 3/2023 | Yuan | G06F 18/2148 |
| | | | 704/9 |
| 2023/0177097 A1 * | 6/2023 | Boymel | G06F 16/9535 |
| | | | 707/706 |

* cited by examiner

*Primary Examiner* — Leonard Saint-Cyr
(74) *Attorney, Agent, or Firm* — David H. Judson

(57) ABSTRACT

A method of generating content in association with an information search and retrieval system. It begins by receiving a query from a user. The query is semantically-searched to identify a context. A conversation history between the user and the system is identified. An enriched query is then generated by associating to the query both the context and at least a portion of the conversation history. The enriched query is then evaluated/processed by a generative-AI. In response, information associated with the enriched query is received from the generative-AI. A response to the query is then generated using the information, e.g., by passing the information back to the user, by modifying (e.g., editing or supplementing) the information to generate modified information and passing the modified information back to the user, or by dismissing the information. If sensitive information is identified in the utterance, it is masked prior to generating the enriched query.

15 Claims, 13 Drawing Sheets

MEETING ACCEPTED, IN SALES CHAT

| | OBSERVATION | KEY MOMENT | INSTANCE ID | STEP INDEX |
|---|---|---|---|---|
| SALES REP: "YOU SEEM TO HAVE A LOT OF QUESTIONS." "WOULD YOU LIKE TO SCHEDULE A MEETING WITH ONE OF OUR ACCOUNT EXECUTIVES TO LEARN MORE?" | speech_act: notice_questions | OFFER MEETING | 3 | 1 |
| | speech_act: ask_meeting | OFFER MEETING | 3 | 2 |
| PROSPECT: "YEAH, I HOPE TO GET GOING WITH YOUR PLATFORM ASAP." | speech_act: yes | OFFER MEETING | 3 | 3 |
| SALES REP: "PERFECT, CHOOSE A TIME THAT WORKS FOR YOU" | speech_act: prompt_time | OFFER MEETING | 3 | 4 |
| SALES REP: ACTION: Show_Date_Time_Picker | phys_act: select_time | OFFER MEETING | 3 | 5 |

FIG. 2A

MEETING DECLINED, IN SALES CHAT

| | OBSERVATION | KEY MOMENT | INSTANCE ID | STEP INDEX |
|---|---|---|---|---|
| SALES REP:<br>"YOU SEEM TO HAVE A LOT OF QUESTIONS."| speech_act:<br>notice_questions | OFFER MEETING | 5 | 1 |
| "WOULD YOU LIKE TO SCHEDULE A MEETING WITH ONE OF OUR ACCOUNT EXECUTIVES TO LEARN MORE?" | speech_act:<br>ask_meeting | OFFER MEETING | 5 | 2 |
| PROSPECT:<br>"NO, THANKS." | speech_act:<br>no | OFFER MEETING | 5 | 3 |
| "I'M STILL EVALUATING VENDORS." | speech_act:<br>shopping_around | OFFER MEETING | 5 | 4 |
| SALES REP:<br>"ALRIGHT, YOU KNOW WHERE TO FIND ME WHEN YOU ARE READY" | speech_act:<br>come_back_soon | OFFER MEETING | 5 | 5 |

FIG. 2B

302 { The utterance: "Would you like to schedule a meeting with one of our account executives to learn more?"

300 {
Has the following event-level metadata as a tag:
```
{
    "key_moments":   [
        {
            "key_moment_label": "offer_meeting" ,
            "observation" :   {
                "type": "speech_act" ,
                "value" : "notice_questions"
            },
            "instance_id" : 3 ,
            "step_index" : 2
        }
    ]
}
```

FIG. 3

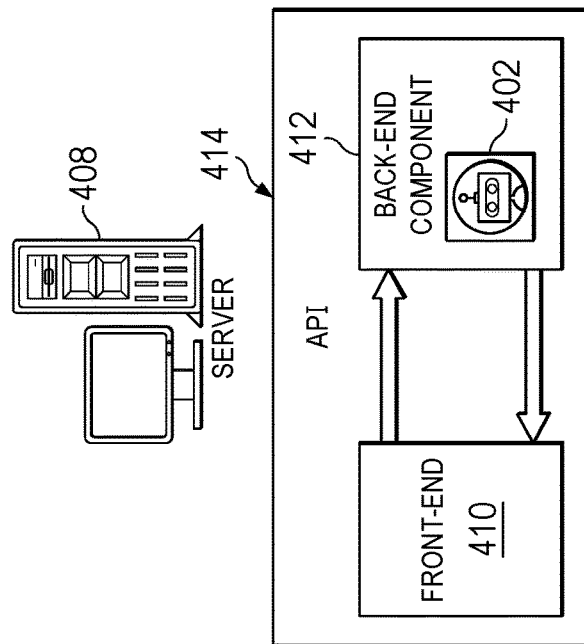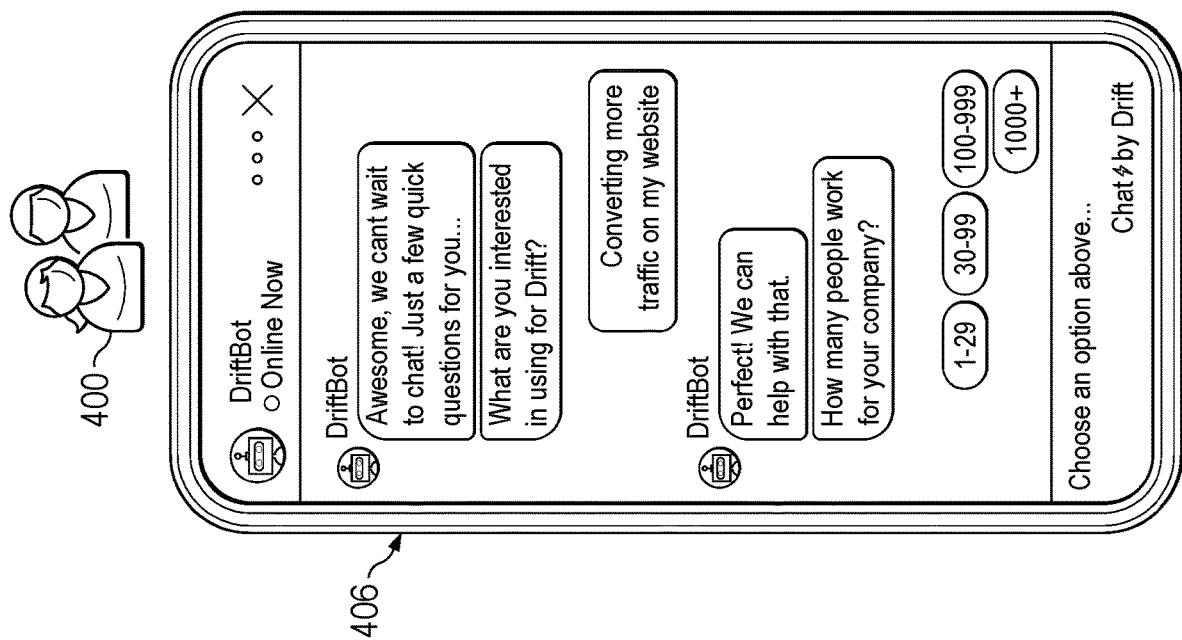
FIG. 4

```
endpoint: /v1/chat_reply
Payload: 902
{
    "model": "generative-model",
    "temperature": 0.
    "n": 1,
    "prompt": "How can drift help me create revenue?",
    "pii_scrubbed_prompt": "string",
    "contextualized_prompt": "string",
    "org_id": 1,
    "conversation_id": 0
}
```

FIG. 9

```
{
    "id": "8e0dc333cfb241f8844c036d052be856",
    "reply": [
        "Drift can help you create revenue by providing personalized expertise from the category leader. Our powerful and easy-to-use solution is informed by our best practices and expertise in conversations, so you can see results with Drift twice as fast."
    ]
}
```

```
endpoint: /v1/mask

Payload:

{
    "utterance": "Hello my name is John Doe",
    "org_id": 1
}
```

```
{
    "utterance": "Hello my name is <PERSON>"
}
```

FIG. 14

INTERACTIVE CONVERSATION ASSISTANCE USING SEMANTIC SEARCH AND GENERATIVE AI

BACKGROUND

Technical Field

This application relates generally to information retrieval methods and systems.

Background of the Related Art

Online conversational marketing is a well-known technique designed to move buyers or prospects through marketing and sales funnels through the power of real-time conversations. In this approach, and instead of forcing users to go through lead capture forms and wait days for a response, conversational marketing uses targeted messaging, live chat and intelligent conversational bots (chatbots) to engage with users when they visit a website (in real-time, or through other channels, such as SMS or email). A chatbot is a software application that executes on the site and that is used to interact with the user, often in lieu of a direct human interaction. Typically, conversational bots are of several types. A rules-based chatbot follows pre-designed rules that form a decision tree. Decision trees are simple graphs created by hand. They are easy to build, but brittle, and they do not scale. Also, in use, decision trees are proactive, as they control the bot to lead the conversation, typically by asking lots of questions. A more sophisticated approach is an Artificial Intelligence (AI)-based chatbot that uses a different approach from decision trees, namely, intents. Intents use machine learning to classify a user's input, and then activate a corresponding skill. The skill is a context that either uses a graph to direct the flow (like a decision tree), or it has a set of slots that need to be filled by asking questions. Intent-based bots are more robust than decision tree bots, but they are not very flexible to context switches once an intent is activated. Intent-based bots are reactive; they wait for the user to take the lead to tell the bot what he or she wants to do, or what he or she wants to know. Examples of intent-based bots include Apple® Siri, Amazon® Alexa, Google® Home, and the like.

As valuable as chatbots are as an alternative to human agents (e.g., a Sales Development Representative (SDR)), there may be circumstances where it is desirable to direct an inquiry to an agent in a live-chat mode. For an agent that needs to answer many conversations quickly, there is a need to provide a way to give the agent a head start on composing his or her responses. In particular, when a new message from a lead comes in to a conversation for which the agent is responsible, he or she wants (and is expected to) answer that question as quickly (as possible) so that the lead can be progressed down a sales funnel or other service or support workflow.

BRIEF SUMMARY

To that end, this disclosure describes a method and system for providing an interactive conversation tool that enables a service provider and its customers to generate more accurate and relevant answers to outside inquiries during such conversations, e.g., a live-chat mode with an agent, a conversation that occurs in association with other process automation, and the like. The approach leverages semantic search and generative-Artificial Intelligence (AI).

According to one aspect, a method of generating content in association with an information search and retrieval system is described. The method begins by receiving an utterance from a user. The utterance (a "query") is semantically-searched to identify a context associated with the query. In addition, preferably a conversation history between the user and the information search and retrieval system (typically the history that includes the query utterance) is identified. An enriched query is then generated by associating to the query both the context and at least a portion of the conversation history. The enriched query is then evaluated/processed by a generative-AI, such as a transformer-based language model. In response to that processing, information associated with the enriched query is received. The information is the response to the enriched query that is generated by the generative-AI model. A response to the query is then generated using the information, e.g., by passing the information back to the user in response to the utterance, by modifying (e.g., editing, supplementing, or the like) the information to generate modified information and passing the modified information back to the user, by dismissing the information, or otherwise). If personally-identifiable or other sensitive information is identified in the utterance, preferably it is masked or otherwise obscured prior to generating the enriched query. The information may also be fed back to a semantic search generative model to improve the semantic search function going forward.

The foregoing has outlined some of the more pertinent features of the subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the subject matter and the advantages thereof, reference is now made to the following descriptions taken in conjunction with the accompanying drawings, in which:

FIG. 2A depicts a representative instance of an "Offer Meeting" event and its associated tagged entries, in this case representing a meeting offer and its acceptance;

FIG. 2B depicts another representative instance of an "Offer Meeting" event and its associated tagged entries, in this case representing a meeting offer that is declined;

FIG. 3 depicts an example of event-level metadata corresponding to an utterance;

FIG. 4 is a block diagram depicting an information retrieval system in which the technique of this disclosure may be implemented;

FIG. 9 depicts a representative request directed to the suggested replies API of this disclosure;

FIG. 10 depicts a sample response as returned to the suggested replies API from an external generative AI request;

FIG. 13 depicts a representative request directed to a motivation API sub-component by the generative chat app API;

FIG. 14 depicts a sample response as returned to the generative chat app in response to the request shown in FIG. 13.

DETAILED DESCRIPTION

Figure 1:
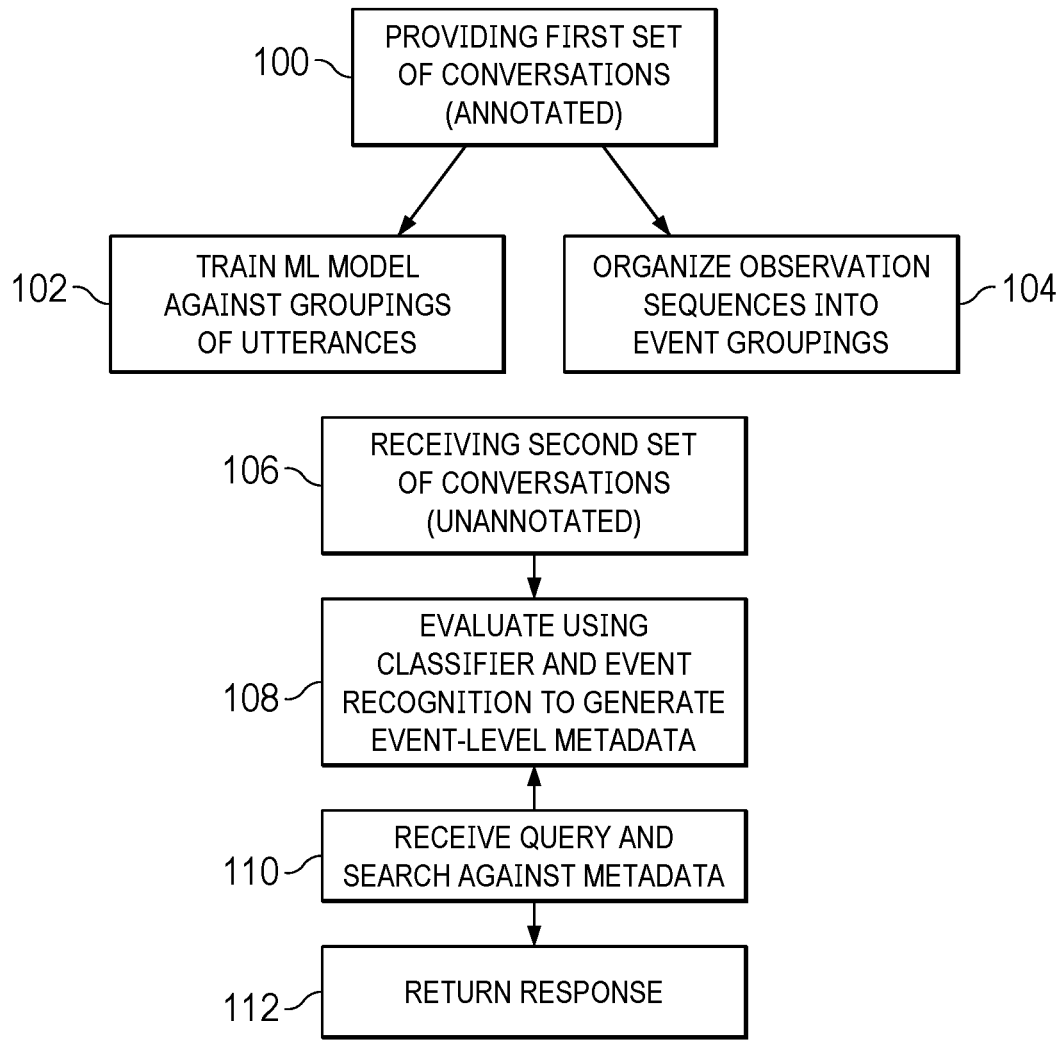
FIG. 1 depicts a method for event-based semantic search and retrieval according to the techniques of this disclosure.

The techniques of this disclosure leverage semantic search and information retrieval that is context-based, preferably leveraging the informational structure of dialogs, e.g., that are captured from historic human-human and/or human-bot interactions.

By way of background, the following is a glossary of terms that are used herein:

Event: a sequence of observations, recognizable as a coherent behavior. Observations within the sequence can be an arbitrary mix of speech acts and physical acts, from multiple actors. One event can be represented by many different possible expressions of that event.

Event expression: one specific sequence of one or more observations that can represent some event. An event may unfold in many different ways, i.e., there may be many different sequences of saying things, and taking physical actions.

Event recognition: inferring which event is unfolding, or has unfolded, by comparing a sequence of observations to sequences that compose the expressions for some event.

Event aliasing: inferring which event is unfolding, or has unfolded, with an inexact match. When an exact sequence is not recognized, a closest inexact match can be determined and presented as an alias such that further processing can then be performed as if the closest inexact match was recognized as a known sequence.

Observation: an atomic action taken by an actor. Each action may be a physical act or a speech act. One or more observations may be intermingled between or among events as the events unfold in parallel, in which case the events themselves are active (in time) concurrently. Each observation is a member of one event, but as noted events can overlap in time, e.g., given observations 1-4, observations 1 and 3 may be part of event 1, while observations 2 and 4 may be part of event 2, such that events 1 and 2 are both active over a time period. As this example shows, observations from different events may be arbitrarily sequenced among observations from other events.

Physical act: a non-linguistic action taken by an actor, e.g., clicking a button or a link on a Graphical User Interface (GUI), entering data in a form, or the like. A physical act also may be received via more sophisticated data entry mechanisms, such as a gesture-based interface that reads and interprets facial expressions, biometric devices that receive and interpret physical features or movements, etc.

Speech act: an utterance expressed by one actor to another, in natural language. A speech act has some purpose for expressing it, and typically it can be expressed in many different ways to accomplish the same thing. The utterance may be typed text (e.g., in a chat window), transcribed from spoken audio, or the like.

Utterance: a sequence of words that is grammatically complete; usually one sentence.

Multi-turn conversation: typically, an interaction between multiple human actors, or an interaction between an end user participating in a chat, and a conversational bot, typically over multiple question and answer cycles. A multi-turn conversation may involve more than one human user, and more than one bot. For example, a bot may be configured to talk to multiple users concurrently (e.g., participants in a Zoom© web conference). Generalizing, a multi-turn conversation can be from human-human, or human-bot conversations, including a mix thereof. Conversations may derive from multiple and disparate data sources, such as voice calls, conversational bots, web-based conferencing, and so forth.

Event-Based Semantic Search and Retrieval

The techniques herein may leverage "event"-based semantic search and retrieval, which is now described. As noted, an event as described herein is composed of a sequence of observations that are user speech or physical actions. A speech act is a labeled grouping of semantically-similar utterances, and a physical act is a non-linguistic action taken by an actor.

According to one embodiment, and as depicted in the process flow shown in FIG. 1, a method to provide event-based semantic search and retrieval begins at step 100 by providing a set of first conversations that have been annotated (e.g., by human actors) to identify speech acts, physical acts, and events. The set of first conversations may be relatively small in size (e.g., several hundred historical conversations) and they are preferably used in two (2) ways: (1) (at step 102) training a machine learning model against groupings of utterances (in the first conversations) to generate a classifier of speech acts, and (2) (at step 104) organizing observation sequences (in the first conversations) into groupings of events that are configured for subsequent "event recognition." A preferred technique of event recognition is the one that will be described in more detail below, and it involves event pattern matching against a set of inter-related data tables that are organized to facilitate efficient lookup and information retrieval. In an alternative embodiment, event recognition is carried out using an event classifier that has been trained to recognize events, e.g., statistically. After the set of first conversations are processed in this manner, the method continues at step 106 by receiving a set of second conversations. The set of second conversations, however, are unannotated. Typically, the second set of conversations are received as a data stream in real-time or near real-time (in other words, as the conversations are taking place). This is not a limitation, however. In an alternative embodiment, the second set of conversations comprise an organization's historical corpus of conversational transcripts and are retrieved from a data store or some other data repository. At step 108, the set of second conversations is then evaluated using the speech act classifier trained in step 102 and information retrieved from event recognition (using either event pattern matching or the event classifier) carried out against the event groupings created in step 104, thereby generating a set of event-level metadata. The event-level metadata comprises, for each utterance or physical action within an event, one or more associated tags that are configured for efficient querying.

At step 110, and in response to receipt of a query, a search is performed against the event-level metadata. The query may be an utterance, some ungrammatical collection of words, a search-related activity (e.g., selecting an entry from a pull-down list or radio button, entering information in a form, etc.), and the like. A query may include one or more filter criteria. As noted above, and because the event-level metadata has been obtained in part through the event recognition, the search is semantic in nature but carried out with respect to "events" that have been learned from the set of first conversations. In this manner, the technique of this disclosure exploits the informational structure present in the dialogues that have been captured in the historical transcripts, as opposed to merely relying on simple keyword search, or even semantic search over clustered utterances.

At step 112, a response is returned to the query to complete the method. According to this disclosure, typically the response is a set of one or more conversations or conversation fragments (derived from the first set of conversations) that, from an event-based perspective, are semantically-relevant to the query. These conversations (or fragments) typically comprise a list of events that are associated to the query and that were found in the set of first conversations. Typically, an event returned in the list of events is an event that is present in the set of first conversations explicitly, but this is not a requirement. As described in further detail below (concerning "event aliasing"), an event identified for inclusion in the response may be an inexact (albeit "close") match to an event actually present in the first set of conversations. The ability of the system to provide event recognition that includes aliased events provide additional flexibility and enables the semantic retrieval to reach even more potentially-relevant information.

The set of first and second conversations may have one or more turns. As noted above, in a multi-turn use case, a turn typically captures all consecutive utterances from a given (same) conversational entity. Typically, at least some of the conversations in the first and second sets are derived from one of: a human-to-human interaction, and a human-to-conversational bot interaction. A three-way interaction (human-to-bot-second human) may also be captured.

As noted above, the nature of the query may vary, but typically the query is an utterance, or perhaps some ungrammatical collection of words. The manner in which the query is received by the system varies and is implementation-specific. In one embodiment, the set of utterance-level metadata that is created (step 108) typically is stored in a data store or computer memory. That data is then accessible from a search application (or web page) using by a user via an input device such as a client application or browser. In one use case, an event-based information search and retrieval is carried out "as-a-service" that is network-accessible. The user queries the service using a browser, the event-based semantic search is carried out against the event-level metadata, and the response is returned to the user over the network. In an alternative embodiment, the search query is carried out with data and resources co-located (e.g., in an on-premises computing system having the utterance-level metadata available locally). As also noted, one or more filter criteria may be applied to the query, e.g., when the user enters the query in a search field; the filter criteria may be identified/selected explicitly or perhaps entered by the user manually. In addition, or in the alternative, filter criteria may be applied to a response (as opposed to the query itself), such as when a set of conversations or conversational fragments are first returned to the query. The query itself may be explicit, but this is not a requirement, as an alternative query may simply involve a search activity such as a selection from a dropdown menu or the like, and wherein the query (with or without filter criteria) is formulated based on the activity.

As used herein, a "tag" refers to an attribute, a property, a characteristic or the like associated to a given utterance that has been identified by the speech act classifier. According to one preferred embodiment, one type of tag is a "moment of interest" (or "key moment"), where the "interest" depends on the use case. For example, and in the case of a CRM system or the like, the key moment may be an "offered meeting" moment, or a "pricing" moment. Because the system works on events, a key moment may span multiple utterances or actions (possibly organized into turns) within a transcript and forming an event, and there may be multiple instances of the same or different key moments within one conversation. Thus, preferably a tag has an associated instance identifier and step identifier representing the particular instance of the key moment, and the relative location within the event representing the key moment.

Typically, a query to the event-level metadata seeks some conversational moment of interest to the user. Based on the event recognition, the conversational moment of interest typically is embodied in one of: a speech act label output from the speech act classifier, and an event label derived from a table of events (when event pattern matching such as described below is implemented). In a variant embodiment, a key moment may refer to a grouping of speech act classifier labels, or one or more event labels, such that a one-to-many approach is realized.

As noted above, an additional benefit of event-based searching as described herein is the ability to filter query results by some aspect of the returned data. For example, with an utterance-based search (as in the prior art), it might be possible to find conversational fragments that begin with a sales representative offering a meeting; with event-based search according to this disclosure, it if further possible to find conversational fragments where the representative offered a meeting but where the prospect declined. On an utterance-based level, searching for the prospect declining a meeting is likely impossible because the language is too ambiguous and could occur in too many contexts (e.g. "no thanks" or "not yet"). In contrast, event-based searching as contemplated herein makes it possible for the system to find conversational fragments where a prospect says "no" or "not yet" after a representative offered a meeting.

Semantic-based search of the informational structure of a dialogue according to the process flow in FIG. 1 provides significant advantages, as it enables event-based searching of conversation text based on semantic clustering instead of raw words (keywords) or surface form, and it returns sequences of utterances and physical actions that are recognizable as coherent, meaningful key moments. Events may be arbitrary in length and include utterances (and physical actions) that are fluidly or arbitrarily intermixed. The technique facilitates conversational analysis and semantic searching with respect to multi-turn conversations (although this is not a limitation), providing rich event-based detail about how a conversation transpired or unfolded.

As one example use case, the approach herein enables enterprises and organizations (e.g., marketers) to mine and find relevant conversations (or conversational fragments) in their data in an efficient and useful manner. As a specific, but non-limiting use case, an organization uses the above-described semantic search functionality in association with automatic sales deal review. The organization captures historical transcripts from human-human conversations, human-bot conversations, and the like. Using the semantic search (or semantic timeline labeling) for events as described herein, one or more events may then be queried for relevant key moments. For example, assume that a search for the key moment "Offer Meeting" has been initiated. There are many ways in which this search can be carried out. In one embodiment, the user searches for event instances of the key moment using a drop-down menu that lists the available key moments. In an alternative embodiment, the user searches by typing a query that he or she believes will generate relevant responses, such as "would you like a meeting?" Assume now that a query has been made. Within the data structures maintained by the system, one of several possible responses is available.

In particular, one possible response is the event 200 instance depicted in FIG. 2A (for the "Offer Meeting" event), with its associated sequence of observations that have been identified from the conversation between the sales representative and the prospect. As depicted, each utterance or physical action in the event has an associated set of tags, namely: observation, key moment, instance ID, and step index. Thus, for example, the utterance "would you like to schedule a meeting with one of our account executives to learn more" has been classified in an "ask_meeting" cluster; it is associated with the "Offer Meeting" key moment, which has the instance ID=3. Because the utterance is the second one in the event, it is given the step index=2. Note also that, in the example, the last entry in the list of observations is a physical action, which also includes its associated set of tags that can be queried. As also shown, the event 200 includes the prospect's utterance "Yeah, I hope to get going with your platform ASAP," and thus event 200 represents a conversational fragment in which a meeting was offered and also accepted. In FIG. 2B, in contrast, another possible response is the event instance 202, which like event 200 in FIG. 2A, is also associated with the key moment of interest ("Offer Meeting"). In this example, however, the prospect declined the opportunity as indicated by the utterance "No, thanks," which has the Instance ID=5 and the step index=3. Event 202 also includes a first utterance that the system has associated with an "notice_questions" cluster while the follow-on utterance has been associated with the "ask_meeting" cluster.

Both events may be returned with respect to the query that seeks just the "key moment" of "Offer Meeting." But where the search is more specific, both examples also support filtering the search results, e.g. to find only fragments where a meeting was declined (in which case, only the event 202 identified in fragment in FIG. 2A is returned). In this example, the approach also enables filtering out other examples of "no," e.g., that occurred in other contexts unrelated to a meeting offer.

Generalizing, typically a query is an utterance, as in the example above for the phrase "would you like a meeting?" In the usual case, a classifier is run on the utterance to determine the speech act observation of that input. From there, and as has been described, the system looks up what events that speech act occurs in, as well as what key moment(s) that event is associated with (because a key moment can map to a grouping of events). The system then searches the tags for that key moment to return a response.

Without intending to be limiting, FIG. 3 depicts an example representation (e.g., in JavaScript Object Notation (JSON) format) of event-level metadata 300 corresponding to the identified utterance 302. The event-level metadata comprises a set of tags as shown and, in this example, there is a single key moment associated with the event. As noted above, however, the same event may be associated with multiple key moments. Another way this may occur is if a key moment associated with an event is mixed together with a key moment associated with single utterances (speech acts), e.g., where one utterance may be part of an event and also a speech act (called out as its own key moment).

According to a variant embodiment, the event-based semantic search and retrieval as described above may be combined with a keyword-based search. In one approach, the keyword-based search is used as a fallback (or fail-over) when the results returned for the event-based query do not provide a good or acceptable match according to some criteria (e.g. a configured confidence level).

FIG. 4 depicts a representative information retrieval system in which the techniques of this disclosure may be implemented. This system may be used to capture human-human conversations, human-bot conversations, and the like.

For example, assume that the system is used to capture human-bot conversations and, in particular, a multi-turn conversation is carried out between an end user 400, and a conversational bot software application 402 that executes in a network-accessible computing platform 404. In this example scenario, the end user 400 is a human being that interacts with the platform, typically using a client machine 406 having a browser or mobile application (app). In a typical user case, the software application 402 executes in association with a website 408, although the chatbot functionality may be utilized by multiple distinct websites operated by separate and independent content providers. As such, the computing platform provides the chatbot functionality in a multi-tenant operating environment, although this is not a requirement. The user provides input to the chatbot as speech, as one or more physical actions (e.g., selecting a button or link, entering data in a field, etc.), or as some combination of speech and physical action. In this example, the chatbot 402 is an AI-based conversational bot. As depicted in FIG. 4, here the platform is configured with a network-accessible front end component 410, together with an Application Programming Interface (API)-accessible back-end system 412. The API is depicted at 414. In this example, the back-end system executes an instance of the software application 402 for each multi-turn conversation and, in particular, it provides both an understanding of a user's query (a speech and/or physical input), as well as a possible response to this query. Typically, the front-end system handles inputs from multiple end users that access the platform, and individual responses as determined by the back-end system (and in particular the software application instance that is managing the particular multi-turn conversation) are passed from the back-end to the front-end for delivery to the end user. In the context of a chatbot, the response typically is provided in a chat window.

During a multi-turn conversation between the user and the conversational bot, the system responds to a user input in less than a given time period (e.g., a few seconds) given network latency and transit time, and that such response is both correct and coherent with respect to the history of the conversation so far, i.e., the history of previous utterances or physical actions by the user. To this end, information against which a query is processed preferably is organized in a particular manner. This information typically is a corpus of historical conversation transcripts that are first annotated (e.g., by human analysts) to provide an information database, e.g., queries and associated responses, that have been generated by the system previously. The nature and scope of the annotations are implementation-specific, but the notion is that the database provides a large corpus of possible conversational flows that the system may then use during a real-time multi-conversation between the user and the chatbot.

Figure 5:
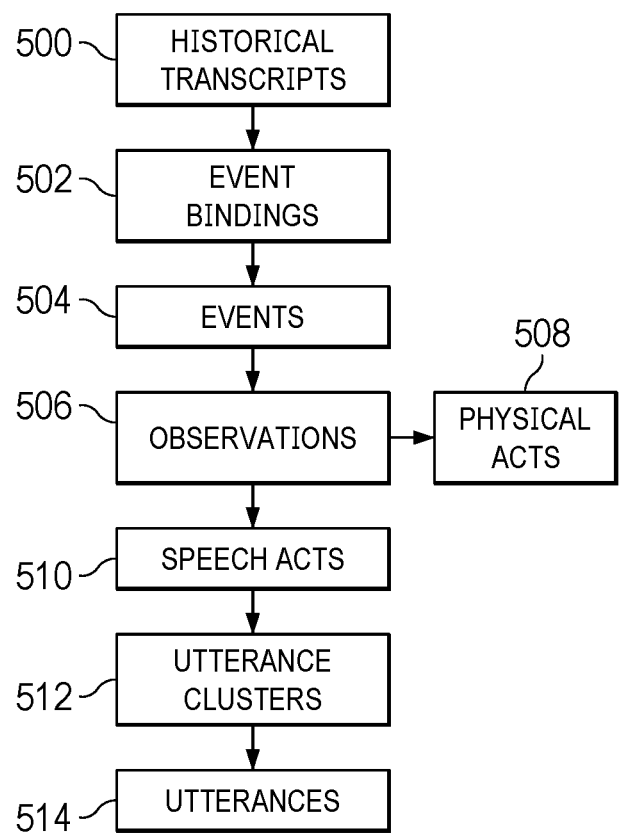
FIG. 5 is a block diagram of a relational database comprising a set of inter-related data tables in which a corpus of annotated conversation transcripts is organized to provide storage-efficient informational retrieval.

As shown in FIG. 5, the conversational transcripts 500 are annotated and then re-organized into a set of inter-related data tables that are structured in a specific manner to enable the system to make fast, discrete comparisons between a live conversation (i.e., a current one) and a corpus of conversions that have been seen in the past (i.e., the annotated historical conversations). This re-organization is sometimes referred to herein as packing. The set of data tables comprises an event bindings table 502, an events table 504, an observations table 506, a physical acts tables 508, and a speech acts table 510. The event bindings 502 table stores a set of event bindings, which are entities that connect lines of transcripts with whatever events these lines have been annotated to represent in the transcript. The events table 504 stores pointers to events, wherein an event typically is composed of a linear sequence of observations that represent an expression of the event. The observations table 506 stores pointers to observations that are either physical acts in the physical acts table 508, or speech acts in the speech acts table 510. As will be described, information in the relational database is searched in response to physical acts or speech acts, and the latter typically are organized as clusters of utterances 512. As defined above, an utterance 514 typically is a grammatically-complete set of words, nominally a complete sentence. Thus, and as depicted, the event bindings (event expressions) point to events, which point to the observations, either physical or speech acts. As will be described, this layout of the relational database enables the system to place an utterance or user action into its appropriate context in a highly-efficient manner, thereby giving the user input meaning within the conversational flow. In particular, the tables allow the system to efficiently search for all instances of an utterance or action (speech or physical act) within the annotated transcripts. Typically, the relational database tables are continually updated as the system interacts with end users; in one embodiment, the data tables are repacked periodically, e.g., every 10-20 minutes, although this is not a requirement.

Figure 6:
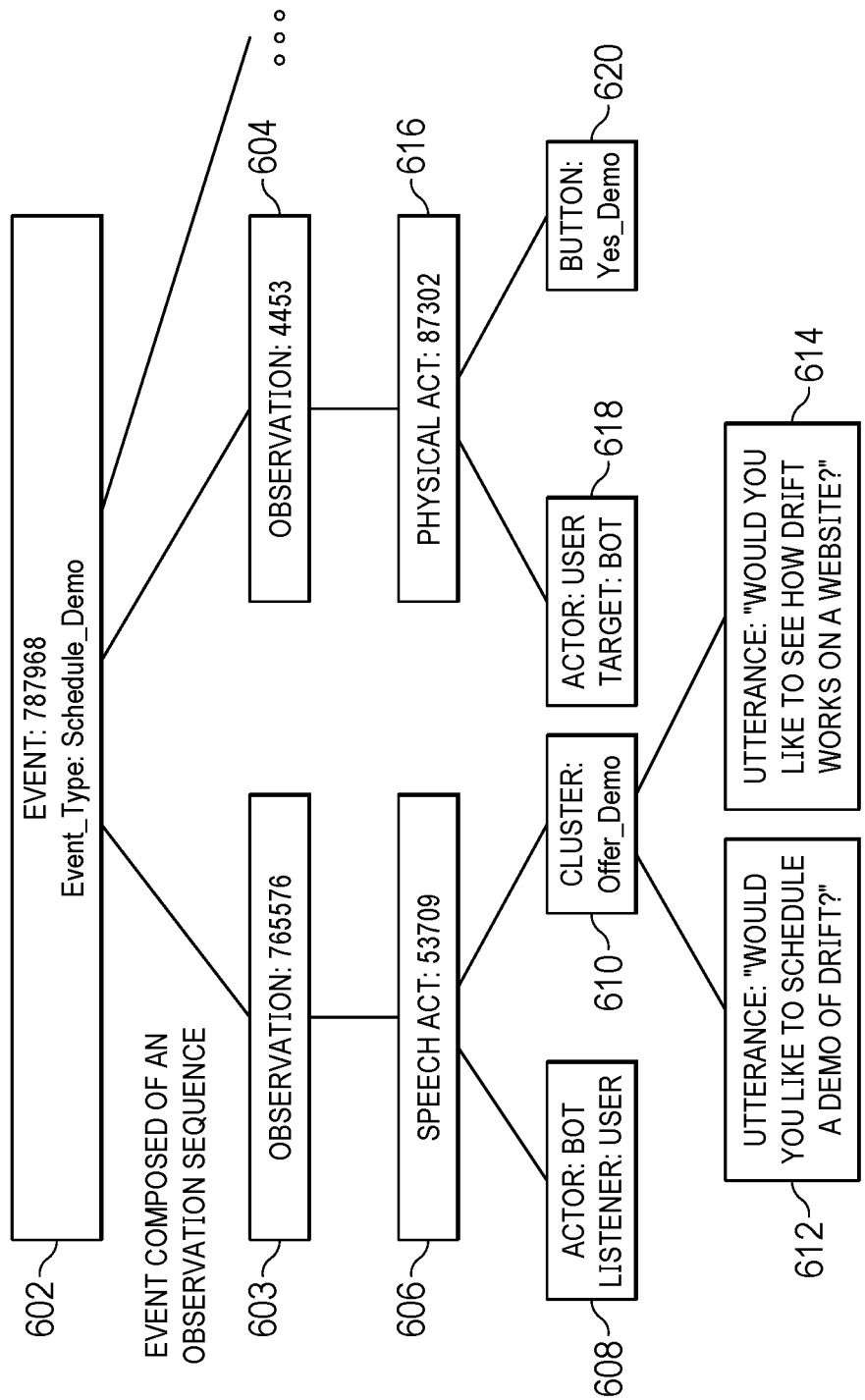
FIG. 6 depicts a representative data model that is persisted in a database and represents a conversational history for a particular conversation or session over one-to-many turns.

Efficient querying is facilitated by representing observations as either speech or physical acts, and which are taken by either actor (conversation participants), and that are fluidly intermixed to form events. To this end, and according to a further aspect of this disclosure, as a multi-turn conversation proceeds, the system generates and persists in memory a data model (or, more generally, a data structure) that represents a conversation history between the user and the bot. Generally, the data model comprises an observation history, together with a set of events that have been determined to represent the conversation up to at least one turn. FIG. 6 depicts an example of one such data model. As depicted, event 602 has a particular event identifier "787968," which is an entry in the events table. The event has a particular type, in this example "Schedule_Demo." Based on the conversation so far, the event is composed of a sequence of observations (looking left to right) including an observation 603 (identifier "765576," which is an entry in the observations table), and observation 604 (identifier "4453," which is another entry in the observations table). Observation 602 points to a speech act 606 (identifier "53709," which is an entry in the speech acts table), which speech act in turn is associated to the conversation participants 608, in this case wherein the "actor" is the bot and the "listener" is the user. As also indicated, the speech act 606 has been associated to an utterance cluster 610, in this example the "Offer_Demo." In this example, the utterance cluster is common to utterances 612 and 614 (e.g., "Would you like to schedule a demo?" or "Would you like to see how the app works on a website?"). Although just two utterances are depicted for the cluster, there may be any number of utterances. The entities 602, 606, 608, 610, 612 and 614 thus comprise a hierarchical representation of a first observation in the sequence of observations that comprise the event, and this activity is implemented by the chatbot.

More generally, utterances such as described preferably are used as training data for a machine learning (ML)-based statistical classifier; upon training, the classifier is then useful for both checking for exact matches, as well as for further generalization, i.e., finding other wordings that have a similar meaning to words and phrases recognized by the classifier.

Referring back to FIG. 6, and continuing with the example, the second observation 604 represents the user's response to what in this example is a prompt from the bot In particular, the observation 604 is associated with physical act 316 having identifier "87302," which is another entry in the observations data table. In this portion of the tree, conversation participants are reversed, such that in entity 618 the "actor" is the user, and the "target" of the physical act is the bot. As also depicted, physical act 616 also points to a particular button 620, representing the user responding that he or she wants to see the demonstration (the "Yes_Demo" action). The data model continues (on the right) with the next follow-on observation, e.g., an utterance by the user, another physical act, and so forth.

The data model represents each event as being composed of an observation sequence, which is sometimes referred to herein as an observation history. As the data model is persisted (and in the depicted tree grows right-ward), the conversation history between the user and the bot is represented. In particular, and at any point in the multi-turn conversation, the data model comprises the observation history, namely, a hierarchical set of events that have been determined to represent the conversation up to at least one conversation turn (and typically many turns). More specifically, the data model is the observation history (everything said, and every button clicked, since the beginning of the conversation), and a tree of events that the system has overlaid on top of the observations to represent the system's best guess at explaining how a linear sequence of observations breaks down into coherent fragments of conversation. Persisting a data model that is built in this manner (and based on both utterances and physical actions) provides significant advantages because real conversations do not always unfold neatly into a linear sequence of topics. Instead, often they are typically quite messy, fluidly oscillating between several topics.

The data model keeps track of any number of events, all of which can be actively "extended" at any time. An event can be extended when appending an identified observation creates a new sequence of observations that exactly matches an existing event expression. Thus, an event can be extended if appending the most recent observation creates a new (longer) sequence that exactly matches a sequence in the events table of the relational database. As noted above, the events table against which the matching is attempted is populated during packing, based on human annotation of events found in real human conversation transcripts. When appending an observation to an existing event expression in the data model is not possible, the system determines if it can create a new event with the observation then being the initial observation for the new event sequence. In circumstances when a particular observation does not fall neatly within an event expression (i.e., it cannot be used extend the event), or when the observation does not make sense as a new event, the system then provides a fallback (or failover) operation to enable processing to continue efficiently. This fallback operation is referred to herein as event aliasing.

Event aliasing refers to the notion of inferring which event is unfolding, or has unfolded, with an inexact match. In particular, when an exact sequence is not recognized, preferably a closest inexact match is determined and presented as an alias such that further processing can then be performed as if the closest inexact match was recognized as a known sequence. When an aliased event is created, the system then proceeds to process the alias event as the event being spoofed (and thus no longer sees the inexact match). Aliasing may be carried out either to extend an event (an "aliased extension"), or even to create a new event ("aliasing a new event"). Preferably, the system first tries to extend an event (using an exact match); then, if extending an event fails, the system then determines if it can create a new event (if this can be done logically given the conversation history so far). Once the latter option fails, the system fails over to attempt to generate an aliased extension and, failing that, performs aliasing for a new event. Event aliasing is advantageous, as it enables the system to provide coherent and appropriate responses even when the database lookup does not return exact (or otherwise useful) results. The mechanism enables the system to pretend it has seen a sequence of observations that exactly matches something in the database, when in reality the system observed something very similar but that, e.g. skips an utterance in the middle, re-orders two utterances within the sequence, or the like. Event aliasing enables to system to operate coherently even when there is no exact match for a sequence that can be extended with the most recent observation. In this manner, the sequence is auto-corrected to something that is close enough to what has been observed. This approach ensures that the rest of the system functions efficiently with exact look-ups into tables within the relational database.

The intelligent packing of the relational database, and the use of the data model structured as described, enables the system to participate in a multi-turn conversation, coherently, and quickly. The system has several options for flexibly understanding the meaning of an utterance, where aliasing is the fallback, and where meaning is ascribed based on which observation is seen at which step of an event, within a sequence of events that compose a conversation. Events are of arbitrary length, and they can overlap in time with other events. Thus, and although not depicted in the example event hierarchical representation shown in FIG. 6, multiple events may be active concurrently.

In this example depicted in FIG. 6, two different utterances are indicated as being members of an utterance cluster. Preferably, and mentioned above, the system defines utterance clusters by training a machine learning (ML) classifier.

Figure 7:
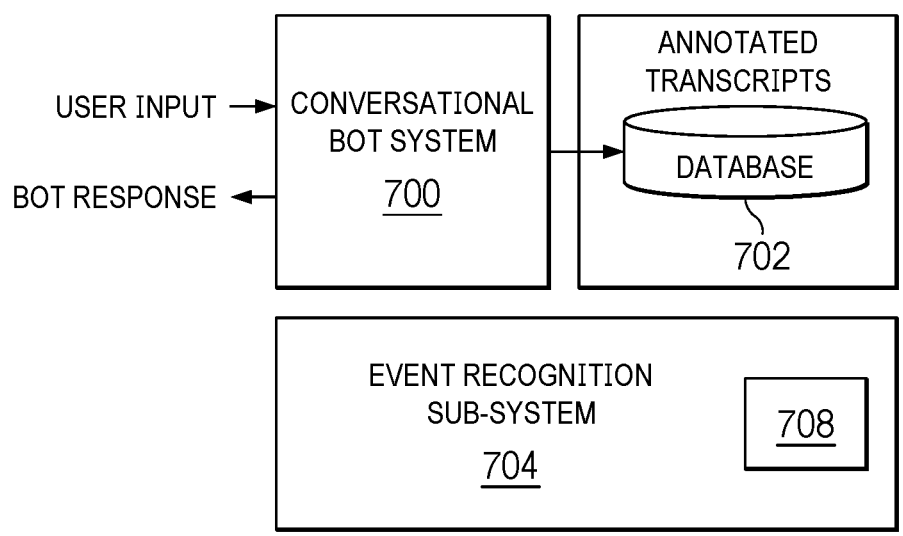
FIG. 7 depicts a representative system interaction showing processing of a user query.

A conversational bot system 700 is shown in FIG. 7. The system is configured to process a query (e.g., a user utterance or physical act) within a given turn of the multi-turn conversation. It assumes that the corpus of annotated conversation transcripts is packed into a relational database 502 comprising the set of inter-related tables as shown in FIG. 5. As noted, preferably these tables include a table of events, a table of observations, a table of physical acts, and a table of speech acts. As will be described, the relational structure includes the pointers (keys) identified, and preferably look-ups in to the database are performed on a constant-time basis such that only a single database query into the data structures is required for each database access (although there are typically several of such accesses as will be described).

At a high level, the system 700 comprises several main components including an event recognition sub-system 704. The event recognition sub-system 704 has several basic functions. Initially, and upon receipt of a new user input, the event recognition sub-system 704 tries to decide how to interpret what was actually said to the bot given what has been observed previously. Typically, an input can be successfully interpreted if two conditions are met: (1) the user's input can be recognized as a speech act or physical act that exists as an observation in the historical data, and (2) this observation can legally extend an event or start a new event, giving contextual meaning to the observation.

As noted above, event recognition is the process of first trying to extend an event, or adding a new event, or (failing those options) performing aliasing. In general, this evaluation is carried out using an initial lookup into the database of historical transcripts to identify one or more candidate interpretations, followed by a filtering of the candidates for coherency (sometimes referred to herein as "coherency filtering"). More formally, a candidate interpretation typically corresponds to some human annotation found in the historical conversation transcripts that were indexed during the packing operation. In one exemplary implementation, the candidate interpretation is a pointer identifying specific lines of historical data in the set of inter-related tables that comprise that relational database 402. Another way of describing a candidate interpretation is as an instance of observations, e.g., one candidate interpretation might be a specific utterance in a specific transcript that expresses the speech act "hello" with the line "hey man nice to see you." Multiple candidate interpretations are identified by a set of pointers to specific lines in the transcripts, representing instances of observations.

Preferably, the input to event recognition sub-system 704, where the system tries to extend an event, etc., is represented as a sequence of observation identifiers (IDs), rather than instances. An ID is akin to a type of observation that may appear many times in the annotated historical data, rather than one instance of an observation with that ID. To take a concrete example, assume the user utterance is "hello kind sir." The classifier is run against the utterance, and in this example the classifier assigns the utterance the speech act label "hello." From this, the system looks up a speech act ID (for this label) from the speech acts table. Then, from this speech act ID, the system looks up an associated observation ID in the observations table. These lookups typically are done at once, through SQL table joins. After determining what observation ID "hello kind sir" maps to, the system tries to use this observation ID to first extend an event. To this end, preferably the data model is updated to reflect that the event is extended (at this point, merely an assumption that the event can be extended), and it is the resulting modified event that the system then uses to perform the initial lookup described above, namely, to fetch the one or more candidate interpretations. These candidate interpretations are instances of observations with the observation ID previously mentioned, e.g., where the system found things like "hello."

In addition to obtaining the one or more candidate interpretations, the event recognition sub-system 704 evaluates the candidate interpretations that it fetches, with the goal of identifying one candidate interpretation that it will then provide to update the data model. In this initial pass, the event recognition sub-system 704 functions to attempt to understand the user's input. A mechanism 708 for performing this function preferably comprises a set of evaluation agents that are sometimes referred to herein as "critics." Critics preferably operate over candidate interpretations. As used herein, a critic typically is a software agent (e.g., implemented as a Python class) that evaluates a candidate interpretation against a statistical model, a set of hard-coded rules, or some other data or criteria, in each case to determine whether the candidate interpretation should be used to potentially update the data model. Preferably, there are a plurality of separate and distinct "critics," with each critic providing a particular type of analysis, and a particular candidate interpretation must pass each and every critic. In other words, preferably the critics collectively provide a Boolean AND function such that a candidate interpretation is not accepted for use to update the data model unless all critics are satisfied. Although this approach is preferred, the all-or-nothing criteria may be relaxed. The nature and processing performed by a critic may vary from computationally-simple tasks (e.g., evaluation of business logic), to more complex evaluation tasks (e.g., evaluation against a statistical model). The critics may be arranged sequentially, such that the more computationally-simple tasks are tested before the more complex ones. Critics may also operate in parallel with one another, and one or more critics may be combined into a single critic. In this manner, the critics selectively filter the candidate interpretations so as to ensure that the bot operates coherently and consistently given the conversation so far.

As noted above, event recognition tries to extend an event if it can do so. To this end, and as part of the event recognition function, the critics are executed against the set of candidate interpretations. If this initial pass through the critics returns a positive result, work of the event recognition sub-system is done (for this first pass), as the sub-system has recognized the user's input. If, however, the initial pass through the critics returns empty-handed (i.e., no candidate interpretation survives), then the event recognition sub-system tries to assign a new event. The new event is a new instance of an event that will initially have only one observation in it, namely, a candidate interpretation that makes it through the critics. To this end, a second pass through the critics is performed. This second pass may or may not identify a candidate interpretation. If a candidate interpretation passes the critics, it is used for the new event. If, however, evaluation of the new event also returns empty-handed (i.e., no candidate interpretation logically starts a new event), the routine then continues by moving on to event aliasing. As noted above, first the system tries an aliased event, where the system allows an aliased addition, namely, where a new instance of an event is started at a position in the conversation where the system has not seen (in the historical data) that kind (label) of event start. Once again, the critics are run again in an attempt to find a candidate interpretation. Processing efficiencies are provided by caching results of the critic evaluations where possible. The result of this iterative process (trying first to extend an event, or start a new event, or aliasing an event, etc.) is a given candidate interpretation.

To this end, the given candidate interpretation identified by the event recognition sub-system is applied to the data model to produce an adjusted data model. As used herein, adjusting the data model may involve an addition to the data model, or not rolling back a change (which typically occurs when a candidate interpretation is rejected by a critic).

Critics may be the same or distinct software agents. By way of example, the following agents may be used for event recognition:

CriticStaleExtension—after some number of conversational turns have passed, it becomes unlikely that something someone just said is supposed to be interpreted as an extension of something said long ago in the conversation. This critic rejects an interpretation that tries to extend an event that has not changed in the recent several turns.

CriticExtendedEventTypeChange—sometimes extending an event with one more observation changes the label (and thus the meaning) of that event. The system needs to be careful about allowing a semantic shift like this. If the original event was not an alias, and changing the event label leaves it in a position in the conversation history where this ordering of events has not been observed, then the label change (via the event extension) that would lead to this unfamiliar ordering of events is not allowed.

The above example agents are not intended to be limiting.

The above description of event recognition is not intended to imply an active operation; for semantic search and retrieval the system runs in a passive mode that only observes and does not taken action within a particular active conversation.

Live-Chat Mode Suggested Replies

With the above as background, the following describes the interactive conversation (e.g., live-chat) assistance method and system of this disclosure. As a shorthand, and without intending to be limiting, this functionality is referred to as "suggested replies." As will be seen, the approach leverages a generative AI (e.g., a language model such as OpenAI ChatGPT) to facilitate generation of a reply to an utterance that is received by the system during the interactive conversation, typically a conversation between a user and an agent. While the following description focuses on the user-live agent use case, this is not a limitation. The interactive conversation may also involve some automated process as a participant. Typically, and in the live agent use case, the utterance is a written query or question that the user enters into a conversational chat interface as previously described, although this is not a limitation, as the utterance may be received in the system in other words (orally, email, text message, an input form, or the like). In a representative implementation as described below, the technique is implemented as an Application Programming Interface (API) (here, referred to as the suggested replies API) in a conversational bot-based information and retrieval system that also supports semantic search, as also described above. An API-based implementation is not a limitation, as the functionality described below may be implemented in association with other types of information search and retrieval systems, applications, processes or programs, or as a stand-alone functionality in computer program code.

Turning to the representative API implementation, the suggested replies API is a tool that allows the service provider and its customers to generate more accurate and relevant answers to outside inquiries in live-chat mode using the power of semantic search and generative-AI. The API is accessible to be called by one or more functions of an information and search retrieval system, such as (but without limitation) the conversational-bot based systems described above. As will be described, and in this non-limiting embodiment, the API brings together several sub-API components that are now described with reference to FIG. 8. As depicted there, and in a live-chat mode, a user 800 is associated with a live-chat agent, e.g., an SDR (not shown), and he or she makes an utterance that is received (or intercepted by) the suggested replies API 804. In response, API 804 makes an automated request for suggested replies 806 to a sub-API component, namely, a generative chat application (called generative-chat-app) 808. In this implementation, the generative chat application 808 in turn has associated therewith several additional sub-components including a moderation API 810, and a semantic-search API 812. These sub-components may be shared by one or more suggested replies API instances, and typically there is a suggested reply API instance associated with a particular conversation for a live-chat agent. The semantic-search API 812 leverages the semantic search and retrieval methods described above (or other semantic search functionality) to return context based on a semantic search. The moderation API 810 is used to mask any detected personally-identifiable information (PII) from being passed to the generative AI. Logically, the moderation API sub-component sits between the response from the semantic-search service API and the generative chat application API call to the generative AI text completion endpoint, and it is used extract personally-identifiable information (PII) or other sensitive content so that it is not posted to the generative AI.

In addition, and according to another aspect of this disclosure, a service 805 is provided to control whether to route the AI-generated response to a human (the live-chat agent) or to populate the automated reply back to the Suggested replies API directly. This service enables the AI-generated output to be used without edits, to be revised and then passed on for use, or to be dismissed. With respect to the interactive to a human being, a live-chat agent graphical user interface (GUI) may be used to facilitate any such interaction on the returned generative AI response.

Figure 8:
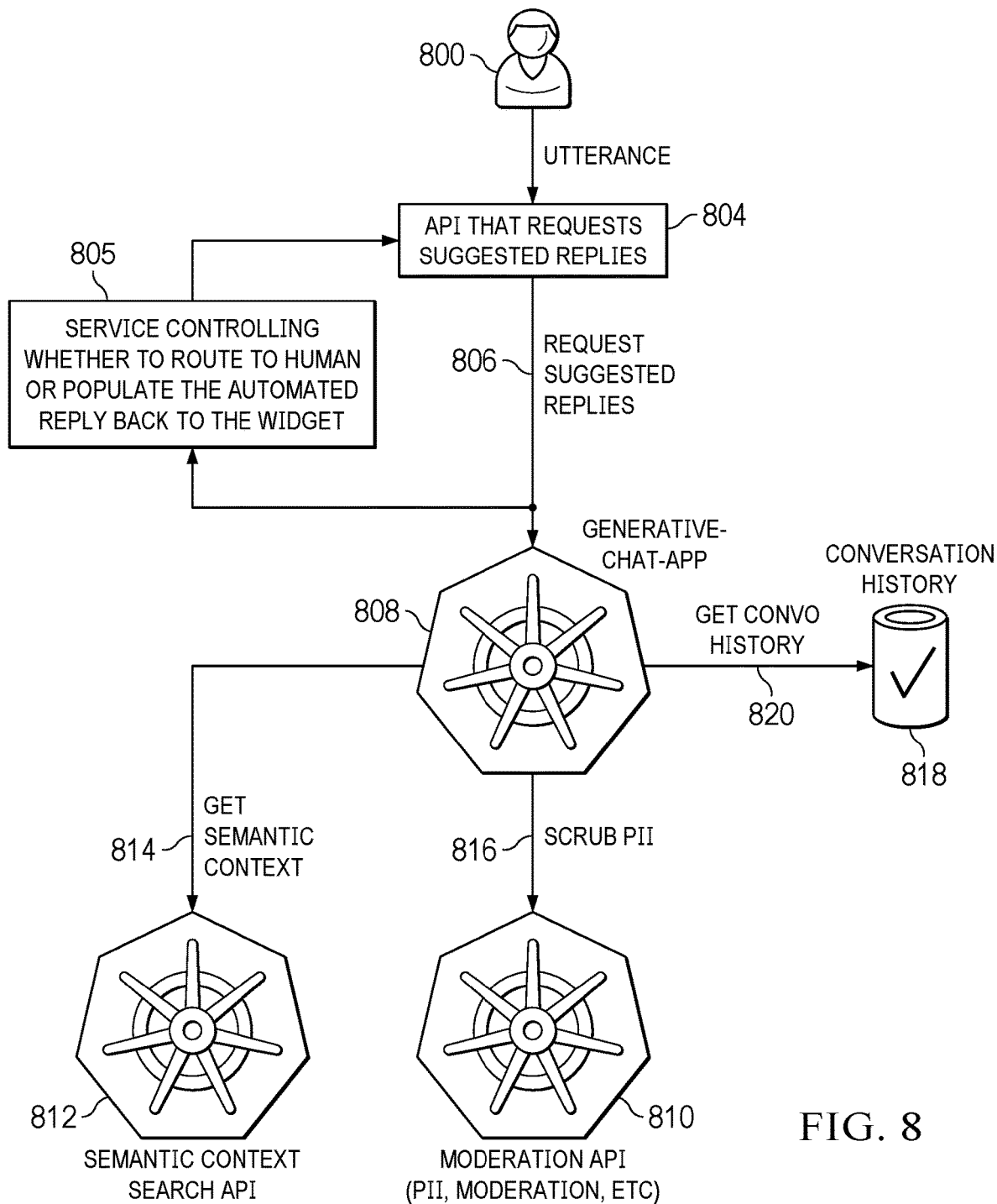
FIG. 8 depicts a general architecture for a live-chat assistance system architecture of this disclosure.

Summarizing, and as depicted in FIG. 8, generative chat application 808 makes several requests, a request 814 for semantic content directed to the semantic context search API 812, and a request 816 to scrub PII directed to the moderation API. The operation of the Suggested Replies API is now described by way of example.

With reference to FIG. 9, assume that the generative chat application is running on an endpoint (identified at the URL 900), and the user has asked the following prompt: "how can Drift help me create revenue?" As depicted, the payload 902 of the request (in this case a post-request) includes several fields including, among others, an identification of the machine learning or other "model" that is currently in use to support the conversation, a "temperature" indicating a relative priority of the request, the prompt, a string identifying particular PII data that should be scrubbed from the request, and a string identifying that a particular context should be associated with the prompt. When the post-request is sent to the endpoint 900, the endpoint passes the prompt value through the semantic-search API to find a relevant context. As noted above, the semantic search and retrieval techniques may be used for this purpose, although this is not a limitation. The semantic-Search API returns the relevant context (when context can be found), and the prompt is then enriched to include it. The resulting enriched prompt is then passed through to a text completion endpoint associated with an external generative AI text completion endpoint, such as OpenAI ChatGPT-3. This particular language model is not intended to be limiting, as other large language models may be used for this purpose. Upon receiving a response from the generative AI text completion endpoint, the suggested replies API returns it, e.g., to a front-end application tool that is managing the conversation (namely, the interaction between the user and the live-agent).

In addition, and according to another aspect of this disclosure, the live-chat agent that requested the generative AI response preferably is afforded the ability to use the output without edits, to make a revision, or to dismiss it. This functionality is depicted by the service flow 805 as shown in FIG. 8. A live-chat agent graphical user interface (GUI) may be used for this purpose.

Figure 11:
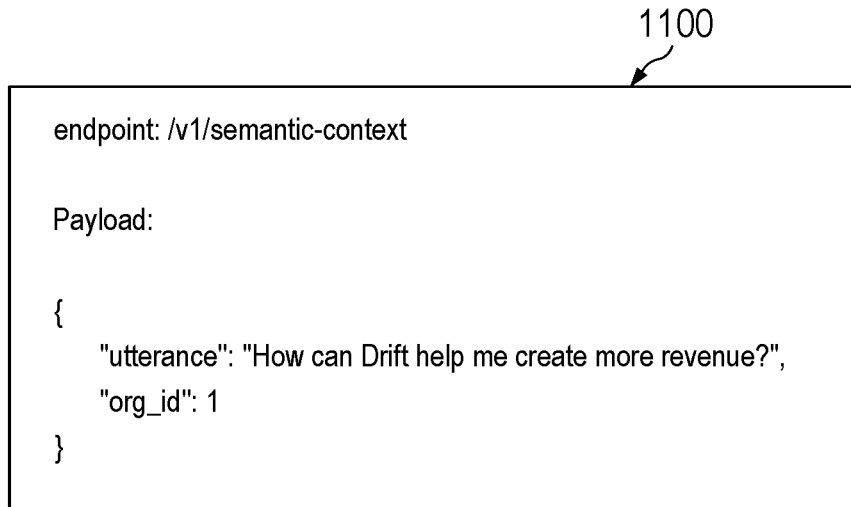
FIG. 11 depicts a representative request directed to a semantic-search API sub-component by a generative chat app API.
Figure 12:
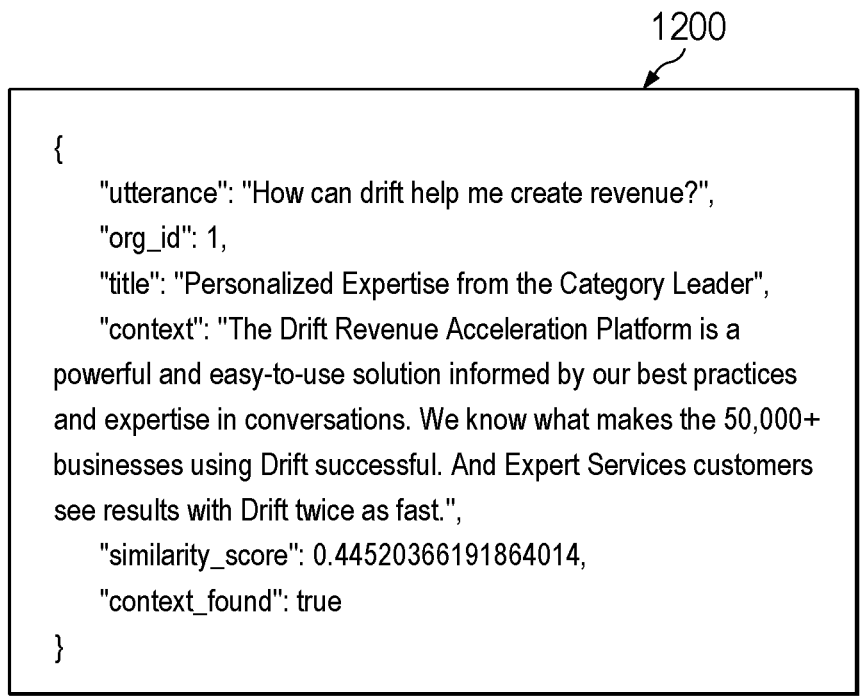
FIG. 12 depicts a sample response as returned to the generative chat app in response to the request shown in FIG. 11.

As described above, the suggested replies API may leverage one or both the semantic-search API, and the moderation API. It is not required that every request be processed by these additional API sub-components, although typically at least the semantic search is used to more carefully refine the prompt that will be directed to the external generative AI. As noted above, FIG. 9 depicts a representative request 900 directed to the suggested replies API of this disclosure, and FIG. 10 depicts a sample response 1000 as returned to the suggested replies API from an external generative AI request. FIG. 11 depicts a representative request 1100 directed to a semantic-search API sub-component by the generative chat app API, and FIG. 12 depicts a sample response 1200 as returned to the generative chat app in response to the request shown in FIG. 11. FIG. 13 depicts a representative request 1300 directed to a moderation API sub-component by the generative chat app API, and FIG. 14 depicts a sample response 1400 as returned to the generative chat app in response to the request shown in FIG. 13.

For semantic search, and besides a text corpus, in one implementation a text embedding model is used, and a search algorithm is used to create a vector database. One model that the Semantic-Search API may use to embed text is a transformer, and FAISS (Facebook® AI Similarity Search) is a library may be used to handle semantic searching. FAISS leverages the hierarchical navigable small world (HNSW) algorithm, which produces state-of-the-art performance with very high search speed. In operation, the semantic-search API receives a post-request from the generative chat application. After filtering for relevant context (e.g., using an organization identifier passed from the generative chat application), the utterance is passed into the vector database to return a semantically-similar context.

The above-described set of APIs may be integrated into a single API, or may be implemented as a standalone set of application code. In addition, and if the information retrieval system supports a generative AI model, all of the above-described functionality may be integrated together without requiring the call-out to the external generative AI model.

The above-described system may leverage Semantic-Content-Ingestion (SCI). SCI is a service that ingests any document type, and it parses a document into digestible text chunks that may then be used by other downstream services (namely, the generative-chat-app and the semantic-search). SCI leverages a Python library, called Unstructured. When a document is received, the SCI service ingests it and converts it into a structured JSON format. SCI may ingest a rolling conversation history, which can facilitate improving semantic-search.

According to another aspect of this disclosure, the suggested replies tool provides for conversation history caching. In particular, and referring back to FIG. 8, the system may cache conversation turns (e.g., in database or other data store) 818 and append the history into the prompt sent to the generative AI. In the example embodiment, this history is retrieved by the generative chat API issuing a request 820 to the database. By affording this history, the generative AI potentially provides more accurate replies. More generally, the goal of this aspect of the tool is to improve the accuracy of suggested-replies by caching conversation history and using it to generate more contextually relevant responses. A conversational history cache stores in a database the text of previous user inputs and replies from either the generative model or the live-agent. Each conversation is associated with a unique conversation ID, which is then used to retrieve the relevant history when generating a response. When user input is received, the generative-chat-application first checks the conversation history cache to see if there is any relevant conversation history. If so, the conversation history is passed to the response generation module along with the current user input and the context found from semantic-search to generate a contextually-relevant response. If there is no relevant conversation history, the response generation module generates a response based on the current user input and semantic-search context, as previously described.

The conversation history caching tool has several benefits. It provide for improved accuracy of the generative AI response. In particular, by using conversation history to generate responses, the tool is able to generate more contextually-relevant responses and improve the overall accuracy of the system. Conversation history caching also facilitates personalization; to this end, the conversation history cache allows the system to provide a more personalized experience to users by incorporating previous interactions into the response generation process. The tool also provides for efficiency; in particular, by leveraging the cached conversation history, the system is able to reduce the number of queries to the generative model endpoint, improving the efficiency and scalability of the system.

Another aspect of this disclosure is that suggested replies responses can be applied in a feedback loop to provide additional benefits. As noted above, the suggested replies API allows a live agent to review and control the responses created by the generative model, with the option to accept the full response, edit the response, or dismiss it. According to this aspect, the system also stores a data set about how an utterance was handled by the system in a database and ties it back to the semantic-search vector-database, creating a feedback loop. The data set may comprise the utterance, the enriched utterance, the context returned by the semantic search API, the response returned by the generative AI, and information about how the generative-AI-generated response was handled (accepted, edited, dismissed, or the like). By collecting this feedback data and sending it back to the vector-database, the system is able to continuously improve the accuracy of the generative model, provide better responses over time, and be more adaptable to nuance.

The generative chat app may be configured to flag responses from the generative AI that have a likelihood of being fictitious.

In summary, the suggested replies functionality enables the agent (or, in an alternative embodiment, some other process automation) to generate a real-time response to complex queries, lower time to response, and eliminate the need to research answers outside of the interactive conversation. This functionality leverages a customer's indexed or other website content, the context of the conversation, and a large language model (LLM) to provide a best possible answer for the agent to use during an interactive conversation. Agents also have the ability to customize the suggested reply before sending, or the agent can dismiss the suggested reply if it does not meet the agent's needs.

Figure 15:
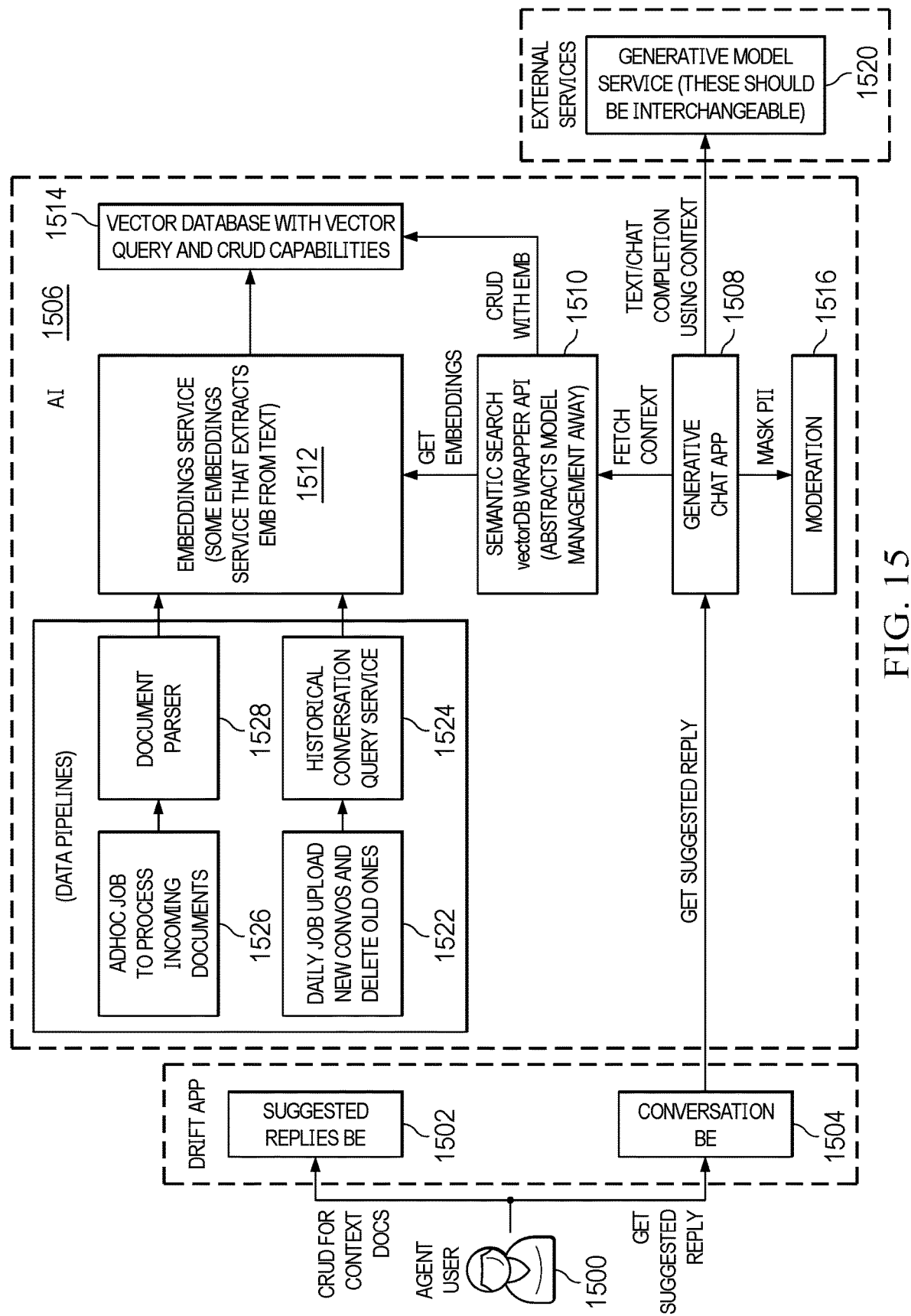
FIG. 15 depicts a specific implementation of the system of this disclosure.

FIG. 15 depicts additional details regarding a preferred implementation of the system architecture of this disclosure. In this embodiment, the live agent 1500 makes a request to the suggested replies service. In particular, preferably the live agent 1500 interacts with a suggested replies back-end (BE) 1502, and a conversation back-end 1504. The replies BE 1502 logs the usage of suggested replies into a relational database, and the conversation BE 1504 is an application that caches the conversation turns and sends them to a suggested replies AI service 1506. The suggested replies AI service 1506 has a number of components. These include the generative chat application 1508, the semantic search service 1510, an embeddings service 1512, a vector database 1514, a moderation service 1516, and several data pipelines 1518. As also depicted, the suggested replies AI service 1506 interacts with one or more external services, such as the generative model service 1520.

The generative chat application 1508 is the service that receives the request from the conversation back-end 1504 and, as previously explained with respect to FIG. 8, acts as the broker between the semantic search 1510, the generative model service 1520, and the moderation component 1516. In operation, the generative chat application 1508 receives an input utterance. The utterance is then sent to the semantic search component for relevant context. The semantic search component sends back relevant context. The generative chat application 1508 then sends the context and the utterance to the moderation service 1516. The moderation service 1516 scrubs PII from the context and utterance. The generative chat service then injects the context and utterance into a prompt, and that prompt is then sent to the external generative model service 1520 where it is applied to the generative model. The generative model service 1520 returns a response, and the generative chat service returns that response to the conversation back-end.

As noted, the semantic search receives the utterance from the generative chat application and retrieves the relevant context, in this scenario from the vector database 1514. In particular, the incoming utterance is passed through the embeddings service 1512, which identifies an embedding and sends it to the vector database 1514 to retrieve the context. The identified context for the utterance is sent from the vector database to the semantic search to complete this portion of the process flow.

The embeddings service 1512 transforms incoming text into a vector of numbers (the "embedding"). As noted above, the embeddings service 1512 connects with the semantic search service, and it also connects with the data pipelines 1518 to embed new data and store it into the vector database 1514.

The vector database 1514 stores all context and conversation history created and uploaded by the data pipelines 1518. The data pipelines update the vector database with new data. In this operating embodiment, the data pipelines comprise several data sources. The conversation history job 1522 collects chat logs that are saved for customers of the platform. These logs are queried periodically (e.g., daily), embedded, and then stored in the vector database by a historical conversation query service 1524, which service also is responsible for selectively pulling chat-logs associated with an organization identifier (org-ID). Reference 1526 represents an ad-hoc document processing job, which is an on-demand service that calls a document parsing service 1528 as necessary to perform text extraction, embedding, and storage of the resulting data in the vector database.

The moderation service 1516, as explained, removes any personally identifiable (or other sensitive) information from the information (utterance, and context) that is used by the generative chat application to create the generative AI prompt supplied to the generative model service.

The generative model service typically operates as an external service and is used to generate a contextual response to the incoming prompt.

Enabling Technologies

Typically, the computing platform that provides information search and retrieval is managed and operated "as-a- service" by a service provider entity. In one embodiment, the platform is accessible over the publicly-routed Internet at a particular domain, or sub-domain. The platform is a securely-connected infrastructure (typically via SSL/TLS connections), and that infrastructure includes data encrypted at rest, e.g., in an encrypted database, and in transit. The computing platform typically comprises a set of applications implemented as network-accessible services. One or more applications (services) may be combined with one another. An application (service) may be implemented using a set of computing resources that are co-located or themselves distributed. Typically, an application is implemented using one or more computing systems. The computing platform (or portions thereof) may be implemented in a dedicated environment, in an on-premises manner, as a cloud-based architecture, or some hybrid.

The system may be implemented on-premises (e.g., in an enterprise network), in a cloud computing environment, or in a hybrid infrastructure. An individual end user typically accesses the system using a user application executing on a computing device (e.g., mobile phone, tablet, laptop or desktop computer, Internet-connected appliance, etc.). In a typical use case, a user application is a mobile application (app) that a user obtains from a publicly-available source, such as a mobile application storefront. The platform may be managed and operated by a service provider. Although typically the platform is network-accessible, e.g., via the publicly-routed Internet, the computing system may be implemented in a standalone or on-premises manner. In addition, one or more of the identified components may interoperate with some other enterprise computing system or application.

Preferably, the platform supports a machine learning system. The nature and type of Machine Learning (ML) algorithms that are used to process the query may vary. As is known, ML algorithms iteratively learn from the data, thus allowing the system to find hidden insights without being explicitly programmed where to look. ML tasks are typically classified into various categories depending on the nature of the learning signal or feedback available to a learning system, namely supervised learning, unsupervised learning, and reinforcement learning. In supervised learning, the algorithm trains on labeled historic data and learns general rules that map input to output/target. The discovery of relationships between the input variables and the label/target variable in supervised learning is done with a training set, and the system learns from the training data. In this approach, a test set is used to evaluate whether the discovered relationships hold and the strength and utility of the predictive relationship is assessed by feeding the model with the input variables of the test data and comparing the label predicted by the model with the actual label of the data. The most widely used supervised learning algorithms are Support Vector Machines, linear regression, logistic regression, naive Bayes, and neural networks. As will be described, the techniques herein preferably leverage one or more neural networks. Formally, a NN is a function g: X→Y, where X is an input space, and Y is an output space representing a categorical set in a classification setting (or a real number in a regression setting). For a sample x that is an element of X, $g(x)=f_L (f_{L-1}( \ldots ((f_1(x))))$. Each $f_i$ represents a layer, and $f_L$ is the last output layer. The last output layer creates a mapping from a hidden space to the output space (class labels) through a softmax function that outputs a vector of real numbers in the range [0, 1] that add up to 1. The output of the softmax function is a probability distribution of input x over C different possible output classes.

Thus, for example, in one embodiment, and without limitation, a neural network such as described is used to extract features from an utterance, with those extracted features then being used to train a Support Vector Machine (SVM).

In unsupervised machine learning, the algorithm trains on unlabeled data. The goal of these algorithms is to explore the data and find some structure within. The most widely used unsupervised learning algorithms are Cluster Analysis and Market Basket Analysis. In reinforcement learning, the algorithm learns through a feedback system. The algorithm takes actions and receives feedback about the appropriateness of its actions and based on the feedback, modifies the strategy and takes further actions that would maximize the expected reward over a given amount of time.

The following provides additional details regarding supervised machine learning. As noted above, supervised learning is the machine learning task of inferring a function from labeled training data. The training data consist of a set of training examples. In supervised learning, typically each example is a pair consisting of an input object (typically a vector), and a desired output value (also called the supervisory signal). A supervised learning algorithm analyzes the training data and produces an inferred function, which can be used for mapping new examples. An optimal scenario allows for the algorithm to correctly determine the class labels for unseen instances. This requires the learning algorithm to generalize reasonably from the training data to unseen situations.

For supervised learning, the following steps are used. An initial determination is what kind of data is to be used as a training set. The training set is then gathered. In particular, a set of input objects is gathered and corresponding outputs are also gathered, either from human experts or from measurements. Then, an input feature representation of the learned function is determined. In this approach, typically the input object is transformed into a feature vector, which contains a number of features that are descriptive of the object. The structure of the learned function and corresponding learning algorithm are then determined. For example, support vector machines or decision trees may be used. The learning algorithm is then run on the gathered training set. Some supervised learning algorithms require a user to determine certain control parameters. These parameters may be adjusted by optimizing performance on a subset (called a validation set) of the training set, or via cross-validation. The accuracy of the learned function is then evaluated. After parameter adjustment and learning, the performance of the resulting function is measured on a test set that is separate from the training set.

One or more functions of the computing platform of this disclosure may be implemented in a cloud-based architecture. As is well-known, cloud computing is a model of service delivery for enabling on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. Available services models that may be leveraged in whole or in part include: Software as a Service (SaaS) (the provider's applications running on cloud infrastructure); Platform as a service (PaaS) (the customer deploys applications that may be created using provider tools onto the cloud infrastructure); Infrastructure as a Service (IaaS) (customer provisions its own processing, storage, networks and other computing resources and can deploy and run operating systems and applications).

The platform may comprise co-located hardware and software resources, or resources that are physically, logically, virtually and/or geographically distinct. Communication networks used to communicate to and from the platform services may be packet-based, non-packet based, and secure or non-secure, or some combination thereof.

More generally, the techniques described herein are provided using a set of one or more computing-related entities (systems, machines, processes, programs, libraries, functions, or the like) that together facilitate or provide the described functionality described above. In a typical implementation, a representative machine on which the software executes comprises commodity hardware, an operating system, an application runtime environment, and a set of applications or processes and associated data, that provide the functionality of a given system or subsystem. As described, the functionality may be implemented in a stand-alone machine, or across a distributed set of machines.

Other enabling technologies for the machine learning algorithms include, without limitation, vector autoregressive modeling (e.g., Autoregressive Integrated Moving Average (ARIMA)), state space modeling (e.g., using a Kalman filter), a Hidden Markov Model (HMM), recurrent neural network (RNN) modeling, RNN with long short-term memory (LSTM), Random Forests, Generalized Linear Models, Extreme Gradient Boosting, Extreme Random Trees, and others. By applying these modeling techniques, new types of features are extracted, e.g., as follows: model parameters (e.g. coefficients for dynamics, noise variance, etc.), latent states, and predicted values for a next couple of observation periods.

Typically, but without limitation, a client device is a mobile device, such as a smartphone, tablet, or wearable computing device, laptop or desktop. A typical mobile device comprises a CPU (central processing unit), computer memory, such as RAM, and a drive. The device software includes an operating system (e.g., Google® Android™, or the like), and generic support applications and utilities. The device may also include a graphics processing unit (GPU). The mobile device also includes a touch-sensing device or interface configured to receive input from a user's touch and to send this information to processor. The touch-sensing device typically is a touch screen. The mobile device comprises suitable programming to facilitate gesture-based control, in a manner that is known in the art.

Generalizing, the mobile device is any wireless client device, e.g., a cellphone, pager, a personal digital assistant (PDA, e.g., with GPRS NIC), a mobile computer with a smartphone client, or the like. Other mobile devices in which the technique may be practiced include any access protocol-enabled device (e.g., an Android™-based device, or the like) that is capable of sending and receiving data in a wireless manner using a wireless protocol. Typical wireless protocols are: WiFi, GSM/GPRS, CDMA or WiMax. These protocols implement the ISO/OSI Physical and Data Link layers (Layers 1 & 2) upon which a traditional networking stack is built, complete with IP, TCP, SSL/TLS and HTTP.

Each above-described process preferably is implemented in computer software as a set of program instructions executable in one or more processors, as a special-purpose machine.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the disclosed subject matter has been described in the context of a method or process, the subject matter also relates to apparatus for performing the operations herein. This apparatus may be a particular machine that is specially constructed for the required purposes, or it may comprise a computer otherwise selectively activated or reconfigured by a computer program stored in the computer. Such a computer program may be stored in a computer readable storage medium, such as, but is not limited to, any type of disk including an optical disk, a CD-ROM, and a magnetic-optical disk, a read-only memory (ROM), a random access memory (RAM), a magnetic or optical card, or any type of media suitable for storing electronic instructions, and each coupled to a computer system bus.

A given implementation of the computing platform is software that executes on a hardware platform running an operating system such as Linux. A machine implementing the techniques herein comprises a hardware processor, and non-transitory computer memory holding computer program instructions that are executed by the processor to perform the above-described methods.

The functionality may be implemented with other application layer protocols besides HTTP/HTTPS, or any other protocol having similar operating characteristics.

There is no limitation on the type of computing entity that may implement the client-side or server-side of the connection. Any computing entity (system, machine, device, program, process, utility, or the like) may act as the client or the server.

While given components of the system have been described separately, one of ordinary skill will appreciate that some of the functions may be combined or shared in given instructions, program sequences, code portions, and the like. Any application or functionality described herein may be implemented as native code, by providing hooks into another application, by facilitating use of the mechanism as a plug-in, by linking to the mechanism, and the like.

The platform functionality may be co-located or various parts/components may be separately and run as distinct functions, perhaps in one or more locations (over a distributed network).

Each above-described process preferably is implemented in computer software as a set of program instructions executable in one or more processors, as a special-purpose machine.

The techniques herein generally provide for the above-described improvements to a technology or technical field, as well as the specific technological improvements to various fields, all as described above.

The above-described solution may be implemented to enable semantic search and retrieval from information irrespective of the how that information originates, e.g., from voice transcripts, chat transcripts, email- or messaging-based transcripts, or otherwise. Thus, the semantic search and retrieval described herein may support multi-channel solutions. Similarly, the example application scenarios, such as those involving historical sales-related transcripts, are not intended to be limiting either.

What is claimed follows below.
The invention claimed is:

1. A method of generating content in association with an information search and retrieval system, comprising:
configuring an application programming interface (API);
responsive to receipt via the API of a query from a user, the query having been received by the information search and retrieval system:
semantically-searching the query to identify a context associated with the query;
identifying a conversation history between the user and the information search and retrieval system;
generating an enriched query by associating to the query both the context and at least a portion of the conversation history;
receiving information associated with the enriched query, the information having been generated by evaluation of the enriched query using a transformer-based language model;
generating a response to the query using the information; and
returning the response to the information search and retrieval system.

2. The method as described in claim 1 wherein receiving information associated with the enriched query comprises:
forwarding the enriched query to an external generative-AI service; and
receiving the information from the external generative-AI service.

3. The method as described in claim 1 further including masking personally-identifiable or other sensitive information identified in the query prior to generating the enriched query.

4. The method as described in claim 1 wherein generating the response comprises one of: passing the information back to the user, modifying the information to generate modified information and passing the modified information back to the user, and dismissing the information.

5. The method as described in claim 1 wherein the conversational history includes a present conversation in which the query arises, and optionally one or more other conversations.

6. The method as described in claim 1 wherein the portion of the conversation history is condensed prior to being associated with the query.

7. The method as described in claim 1 further including updating a semantic search model utilizing the information.

8. The method as described in claim 1 wherein the query is received by a live agent during a live chat session, and the response to the query is provided to the user by the live agent.

9. The method as described in claim 1 wherein the conversation history is a current conversation dialogue between the user and a chatbot that includes the query.

10. A Software-As-A-Service (SaaS) computing platform supporting conversations with a set of one or more live agents, the computing platform associated with an information search and retrieval system, comprising:
computer hardware comprising one or more hardware processors; and
computer memory holding computer software executed by the one or more hardware processors, the computer software providing content in association with a live agent, wherein the computer software comprises program code configured as an application programming interface (API) to:
respond to receipt via the API of a query from a user, the query having been received by the information search and retrieval system;
semantically-search the query to identify a context associated with the query;
identify a conversation history between the user and the information search and retrieval system;
generate an enriched query by associating to the query both the context and at least a portion of the conversation history;
receive information associated with the enriched query, the information having been generated by valuation of the enriched query using a transformer-based language model;
generate a response to the query using the information; and
return the response to the information search and retrieval system.

11. The computing platform as described in claim 10 wherein the program code configured to receive information associated with the enriched query comprises program code configured to:
forward the enriched query to an external generative-AI service; and
receive the information from the external generative-AI service.

12. The computing platform as described in claim 10 wherein the program code is further configured to mask personally-identifiable or other sensitive information identified in the query prior to generating the enriched query.

13. The computing platform as described in claim 10 wherein the program code configured to generate the response comprises program code further configured to perform one of: passing the information back to the user, modifying the information to generate modified information and passing the modified information back to the user, and dismissing the information.

14. The computing platform as described in claim 10 wherein the program code is further configured to update a semantic search model using the information.

15. The computing platform as described in claim 10 wherein the conversation history is a current conversation dialogue between the user and a chatbot that includes the query.

* * * * *